(12) United States Patent
Ponnada

(10) Patent No.: US 11,674,501 B2
(45) Date of Patent: Jun. 13, 2023

(54) MONITORING SYSTEM FOR A WIND TURBINE BLADE, WIND TURBINE ARRANGEMENT AND METHOD FOR MONITORING OF A WIND TURBINE BLADE

(71) Applicant: Siemens Gamesa Renewable Energy A/S, Brande (DK)

(72) Inventor: Sri Markandeya Rajesh Ponnada, Aalborg (DK)

(73) Assignee: SIEMENS GAMESA RENEWABLE ENERGY A/S, Brande (DK)

( * ) Notice: Subject to any disclaimer, the term of this patent is extended or adjusted under 35 U.S.C. 154(b) by 0 days.

(21) Appl. No.: 17/409,173

(22) Filed: Aug. 23, 2021

(65) Prior Publication Data
US 2022/0065228 A1 Mar. 3, 2022

(30) Foreign Application Priority Data
Aug. 25, 2020 (EP) .................................. 20192742

(51) Int. Cl.
*F03D 17/00* (2016.01)
*F03D 80/30* (2016.01)

(52) U.S. Cl.
CPC .............. *F03D 17/00* (2016.05); *F03D 80/30* (2016.05); *F05B 2260/80* (2013.01); *F05B 2280/2006* (2013.01)

(58) Field of Classification Search
CPC .................................. F03D 80/30; F03D 17/00
See application file for complete search history.

(56) References Cited

U.S. PATENT DOCUMENTS

| 10,955,371 B2 * | 3/2021 | Weimer | G01N 27/028 |
| 2005/0213684 A1 * | 9/2005 | Flake | H04L 25/12 |
| | | | 375/295 |

(Continued)

FOREIGN PATENT DOCUMENTS

| CN | 112526260 A | * | 3/2021 | |
| EP | 3043064 A1 | * | 7/2016 | F03D 1/0675 |

(Continued)

OTHER PUBLICATIONS

EPO Search Opinion for corresponding EPO Application 20192742 dated Jan. 26, 2021 (Year: 2021).*

(Continued)

*Primary Examiner* — Topaz L. Elliott
(74) *Attorney, Agent, or Firm* — Schmeiser, Olsen & Watts LLP

(57) ABSTRACT

A monitoring system for a wind turbine blade, wherein the wind turbine blade includes an electrically conducting or semi-conducting structural component and a lightning protection system having a down conductor electrically connected to an lightning receptor, wherein the down conductor is electrically connected to the structural component by an equipotential connector, such that, a network of electrical impedances including the structural component, the equipotential connector and the down conductor is formed, whereby the hybrid monitoring system includes, a sensing device for the network, including a transmitter for emitting an electrical pulse into the network via a first terminal and a receiver for receiving a reception pattern of the electrical pulse from the network via a second terminal, and an evaluation device for evaluating the reception pattern to determine a first health information regarding the lightning protection system, and a second health information regarding the structural component, is provided.

15 Claims, 6 Drawing Sheets

(56) References Cited

U.S. PATENT DOCUMENTS

| | | | |
|---|---|---|---|
| 2013/0336786 A1 | 12/2013 | Kissinger | |
| 2014/0093373 A1* | 4/2014 | Schmidt | G01R 19/165 |
| | | | 416/61 |
| 2018/0010583 A1* | 1/2018 | Andersen | F03D 1/0675 |
| 2019/0170674 A1* | 6/2019 | Weimer | G01M 5/0083 |
| 2019/0178230 A1 | 6/2019 | Sulzer et al. | |
| 2021/0140409 A1* | 5/2021 | Schlüter | F03D 17/00 |

FOREIGN PATENT DOCUMENTS

| | | | | |
|---|---|---|---|---|
| EP | 3211226 B1 | | 1/2019 | |
| EP | 3693601 A1 | * | 8/2020 | |
| EP | 3988783 A1 | * | 4/2022 | |
| JP | 2013029351 A | * | 2/2013 | |
| JP | 2018053900 A | * | 4/2018 | F03D 1/0675 |
| WO | WO-2021228606 A1 | * | 11/2021 | |

OTHER PUBLICATIONS

EPO Search Report for corresponding EPO Application 20192742 dated Jan. 26, 2021 (Year: 2021).*
Fuh-Gwo Yuan (Ed.), "Structural Health Monitoring (SHM) in Aerospace Structures", Woodhead Publishing Ltd., 2016.
Daniel Balageas et al. (Ed.), "Structural Health Monitoring", ISTE Ltd., 2006.

* cited by examiner

MONITORING SYSTEM FOR A WIND TURBINE BLADE, WIND TURBINE ARRANGEMENT AND METHOD FOR MONITORING OF A WIND TURBINE BLADE

CROSS-REFERENCE TO RELATED APPLICATIONS

This application claims priority to European Patent Application No. 20192742.3, having a filing date of Aug. 25, 2020, the entire contents of which are hereby incorporated by reference.

FIELD OF TECHNOLOGY

Embodiments of the present invention concern a monitoring system for at least one wind turbine blade of a wind turbine, wherein the wind turbine blade comprises at least one electrically conducting or semi-conducting structural component, in particular at least one structural component comprising a carbon fiber reinforced polymer (CFRP), and a lightning protection system having a down conductor electrically connected to at least one lightning receptor, wherein the down conductor is electrically connected to the at least one structural component by at least one equipotential connector, such that, in the wind turbine blade, a network of electrical impedances comprising the at least one structural component, the at least one equipotential connector and the down conductor is formed. Embodiments of the present invention further concern a wind turbine arrangement and a method for monitoring of at least one wind turbine blade.

BACKGROUND

While structural components of wind turbine blades have successfully employed glass fiber-based materials, new materials, which may be electrically conductive or semi-conductive, provide advantages. For example, enhanced performance from wind turbine blades can be achieved by using structural components based on carbon fiber reinforced polymers (CFRP). On the other hand, wind turbine blades are the most exposed part of a wind turbine and frequently subjected to lightning strikes. Hence, lightning protection systems for wind turbine blades have been proposed, usually comprising a means for interception of the lightning strike, for example a lightning receptor on the surface of the wind turbine blade (often referred to as air termination), and a means for transferring the large lightning currents to the ground, in particular internally laid cables named down conductors.

As carbon fibers are electrically conductive, also their composites are often electrically conductive. In particular, it was reported that carbon fiber reinforced polymers show a strain-dependent conduction. Conductive structural components, in particular those based on carbon fibers, can be subject to lightning attachment. Thus, conductive materials, in particular carbon, is at least restricted from use in the outermost regions of the blade. Similarly, as longitudinally extending structural components in the wind turbine blade, for example CFRP spar caps, in combination with the metallic down conductor behave as a set of parallel conductors with short separation, a large voltage could build up between them, leading to flashovers, which might damage the wind turbine blade. This risk is managed by providing equipotential connectors, which are often called equipotential bonds, at regular intervals along the length of the structural components, electrically connecting them to the down conductor. However, the anisotropy of, for example, CFRP, and differences in properties with respect to the metallic down conductor make it a challenging task to transfer current between them, leading to sparking and hot-spots via joule heating when the blade is poorly manufactured and/or owing to accrual of damage and/or degradation over lifetime. All these factors can damage the structure of the wind turbine blade and consequently lead to failures of the wind turbine as a whole.

As described above, blades using conductive structural components, in particular CFRP components, utilize a complex design. Most of such wind turbine blades, owing to their length, are generally part of offshore wind turbines, where access and maintenance are both technically challenging and financially burdensome. It is also not practical to stop wind turbine operation for examination and repair without a strong reason. Although CFRP and other materials are used for structural reasons, the fact that they are electrically conductive and able to carry lightning current means that any damage to structural components automatically raises a concern from a lightning protection viewpoint, and vice versa.

Methods for, in particular remotely, monitoring the health of the lightning protection system as well as the structural health of the wind turbine blade have already been proposed in the state of the art. For example, regarding lightning protection systems, it is known to perform resistance measurements of the down conductor, in particular when the wind turbine blade is installed or does not move. For example, an automatic inspection of a lightning protection system on a wind turbine has been proposed in US 2013/0 336 786 A1. A conductor that is part of a testing system extends from at least inside the hub, through the inside of at least one of the plurality of wind turbine blades and connects to a lightning receptor, thereby completing a circuit extending from the lightning receptor to the earth grounding grid. A test current signal may be introduced into the testing system for a leg of the lightning protection system to be tested and an electrical continuity in the circuit using the test current signal may be determined.

Moreover, measurements using drones have been proposed in, for example, EP 3 211 226 B1 and US 2019/178 230 A1.

Regarding structural health monitoring, various methods have been proposed, including but not limited to optical diffraction gratings, piezo sensors, resistive strain gauges and so an. For example, it is referred to the books by Daniel Balageas et al. (Ed.), "Structural Health Monitoring", ISTE Ltd., 2006, and Fuh-Gwo Yuan (Ed.), "Structural Health Monitoring (SHM) in Aerospace Structures", Woodhead Publishing Ltd., 2016. Sensor systems based on fiber-optic sensors in wind turbine blades have also been proposed.

Condition monitoring and controlling of heating elements in wind turbines, in particular for deicing or anti-icing elements in wind turbines, is also known to be achieved by measuring the resistance of the heating element.

SUMMARY

An aspect of embodiments of the present invention is to provide an improved monitoring method regarding the health of a wind turbine blade, in particular combining multiple monitoring tasks and yielding additional information, in particular location of defects.

In a monitoring system as initially described, which is a hybrid monitoring system according to embodiments of the present invention, the hybrid monitoring system comprises, for remotely monitoring both the lightning protection system and the structural health of the at least one structural component,

- a sensing device for the network, comprising at least one transmitter for emitting an electrical pulse into the network via at least one first terminal and at least one receiver for receiving at least one reception pattern of the electrical pulse from the network via at least one second terminal, and
- and evaluation device for evaluating the at least one reception pattern, in particular regarding travelling time and/or pulse shape of received pulses in the reception pattern, to determine a first health information regarding the lightning protection system, in particular the at least one equipotential connector, and a second health information regarding the at least one structural component.

Embodiments of the present invention exploit the fact that an electrical network of impedances is formed by electrically connecting the at least one structural component to the down conductor via at least one equipotential connector by testing this network, in particular by sending an electrical pulse into the network, which is influenced by any electrical impedance variations present in the electrical network, in particular discontinuities, for example caused by structural damages and the like. At another or the same terminal, a reception pattern of received pulses reflected and/or transmitted at these discontinuities is measured.

In other words, embodiments of the present invention propose to use time domain reflectometry (TDR) and/or time domain transmissometry (TDT), which, in the state of the art, have mostly been used to characterize and locate faults in metallic wires and/or cables. If an electrical pulse is sent into the electrical network, reflections will occur at discontinuities, in particular impedance variations, such that some of the incident signal, that is, the electrical pulse, will be reflected and some will be transmitted. Since this may happen at multiple locations in the electrical network of the wind turbine blade, as discussed above, multiple transmitted and/or reflected pulses will be received, resulting in a reception pattern of multiple received pulses. However, the travelling time of a received pulse in the reception pattern includes information on the location of a corresponding discontinuity in the network, while the pulse shape, in particular the amplitude, of a received pulse contains information about the discontinuity itself, for example its impedance and/or impedance variation.

While, in principle, it may be sufficient to measure one reception pattern using a first and a second terminal, an embodiment may measure at least two reception patterns using different first and/or second terminals. In this manner, the evaluation is more robust, in particular regarding the localization of discontinuities. If reception patterns are measured at different points in time, for example, at least two reception patterns may be measured in different rotation positions of the wind turbine blade, such that different load conditions can be examined. In another embodiment, the electrical pulse may also be varied between measurements. For example, the sensing device and/or the evaluation device may be configured to choose an electrical pulse adapted to a measurement task, in particular an electrical pulse adapted to better probe the characteristics of a discontinuity and/or degradation to be further examined. For example, if an impedance variation has been observed in the network in a first reception pattern, a second reception pattern for determining at least one characteristic of the impedance variation may be measured using a different electrical pulse.

In the course of the evaluation, the evaluation device may be configured to determine a location and/or at least one property of a discontinuity associated with a received pulse of the reception pattern. In particular, only received pulses differing from those in a reference pattern, which may have been measured in an intact network, may be evaluated. By determining the location and nature of a discontinuity, it may in particular be associated with either the domain of the lightning protection system or the domain of the structural component, such that first and second health information may be determined.

It is noted already at this point that one and the same terminal may be both a first and a second terminal, in particular when performing time domain reflectometry. Correspondingly, a receiver and a transmitter may be integrated and implemented as a transceiver.

The hybrid monitoring system of embodiments of the present invention thus allow to both monitor the structure, in particular directly related to the integrity of structural components, and the lightning protection system, which is highly critical to the health of the blade and the wind turbine. It is possible to derive apriori information pertaining to the precise location, type and extent of detected damage, such that aid may be provided to service personal in advance. In an embodiment, the monitoring can be applied when the wind turbine is in operation, in particular generating electricity from rotation, and the information may be provided remotely.

The at least one structural component may be chosen from the group comprising a spar cap and/or beam, and/or may comprise a carbon fiber reinforced polymer (CFRP) or other electrically conducting composites. For example, carbon fiber composites are electrically conducting although their specific conductivity is lower than that of metals, such as copper. Structural components, in particular comprising CFRP, such as spar caps, may be positioned away from the neutral axis and see variable strain as the wind turbine blade rotates. The electrical resistance of carbon composites has been observed to depend on mechanical strain. As described, the sections of CFRP structural components, equipotential connectors and the down conductor form a network of, in the case described variable, impedances, that can be monitored electrically and remotely using the monitoring system according to embodiments of the present invention. It should be noted at this point, that, of course, the equipotential connector may also comprise a carbon fiber reinforced polymer (CFRP) or other electrically conducting composites. In particular in such a design, the equipotential connector may also provide a structural function, such that, for example, some structural components may be omitted/replaced by such a multifunctional equipotential connector.

In particular, the evaluation device may at least partly be located external to the wind turbine blade, in particular external to the wind turbine, and be connected to the sensing device and/or the remaining part of the evaluation device by an, in particular, wireless, communication link. In exemplary embodiments, the sensing device may be a remotely operated sensor, having a bidirectional, wired and/or wireless communication link with a remote monitoring center, which comprises at least a part of the evaluation device and may also have a manned or unmanned monitoring station. In such a configuration, the communication link may bypass a wind turbine controller of the wind turbine, or the communication link may pass through the turbine controller, or the turbine controller may itself be or be a part of the evaluation device. In some embodiments, the evaluation device may also be completely positioned at or in the wind turbine and, for example, send or provide the health information to a remote monitoring center.

In summary, embodiments of the present invention provide a hybrid, that is combined, for example, remote, monitoring system that can be used to simultaneously monitor the health of the wind turbine blade structure and the lightning protection system. In particular, a monitoring system is proposed that provides the location, type and extent of detected damage, thus allowing for swift and predisposed, targeted maintenance and repair.

In this manner, a satisfactory remote monitoring of the lightning protection system and the structural health is realised. This allows to consider a wider tolerance threshold on quality and design. For example, CFRP structural components can be placed closer to the tip end of the wind turbine blade, which may lead to increased performance and lower manufacturing time and cost.

Using the monitoring system according to embodiments of the present invention, it is also possible to complete a full inspection of a produced and/or repaired wind turbine blade before leaving the production and/or repair site, in particular a factory, so that effects due to production and/or repair errors in the field are reduced. When the wind turbine blade is installed in a wind turbine, it is possible to remotely track the behaviour of the wind turbine blade, in particular detect damages and/or necessary maintenance, such that only on-demand visits to the wind turbine are required. If repair and/or maintenance in the field is necessary, given the exact location, type and extent of damage or other condition, which are for example included in the first and second health information, service personal can plan in advance, for example, which tools and materials to use as well as scheduling and transport. The tasks can be completed in less time. This is of particular advantage regarding off-shore wind turbines.

Embodiments of the present invention allow proactive or immediate action to be taken, wherein such action can also be automated using control algorithms. That is, the evaluation device and/or a control device receiving and further processing the health information may be configured to generate at least one control signal for the wind turbine based on the health information. In particular, the wind turbine may be controlled to immediately shut down due to structural damage occurring from a lightning strike, and/or thresholds may be adapted if minor damage occurred.

In other words and summing up, the evaluation device may be adapted to determine, as a health information, the location and/or at least one property of a discontinuity, in particular a discontinuity due to damage, described by at least one received pulse of the reception pattern, and/or the evaluation device and/or a control device receiving the health information may be configured to generate at least one control signal for the wind turbine based on the health information, in particular shutting down at the wind turbine if damage fulfilling a criticality criterion is detected and/or adapting at least one threshold value, in particular defining a wind speed interval and/or a turbulence value interval in which the wind turbine may be operated, based on the second health information. In particular, when generating control signals based on health information, the location and/or at least one property of the discontinuity may be evaluated.

As already indicated, monitoring may not only relate to possible damage to the structural health and/or the lightning protection system. Furthermore, for example, aging properties and other lifetime properties of the wind turbine blade may be determined by evaluating the health information over certain time intervals. For example, based on exposed strains, an estimation of the lifetime of the wind turbine blade is possible, which then allows for extension of projects beyond the standard lifetime.

If the monitoring system according to embodiments of the present invention is used, separate structural health monitoring sensors can be avoided. This is advantageous because such sensors often need electricity/communication ability and thus wiring, which may also be subject to high-voltage flashovers. Since the monitoring system is a hybrid monitoring system, fewer electronics and communication channels are required, such that, for example, various other technologies may be installed in the wind turbine blade. As fewer sensor systems are needed and installed, the cost of the wind turbine blade is reduced. Moreover, the wind turbine blade is less crowded, allowing easier service and maintenance.

As already indicated, in embodiments, at least one of the at least one first terminal and at least one of the at least one second terminal may form a combined transmission and reception terminal, such that time domain reflectometry may be conducted, wherein, in particular, the transmitter and the receiver associated to a combined transmission and reception terminal may be provided as one transceiver. Such transceivers may, of course, also be used if different reception patterns are to be acquired, such that a certain terminal is used as a first terminal for a first reception pattern and as a second terminal for a second reception pattern. On the other hand, at least one reception pattern may be measured using first and second terminals at different positions at the electrical impedance network, such that time domain transmissometry is conducted. TDR and TDT may of course, also be combined, in particular using the same or different electrical pulses.

In exemplary embodiments, the down conductor is connected to ground via a ground connection at a root terminal at the root of the wind turbine blade, wherein the ground connection at the blade root and/or the ground connection from the hub to the nacelle comprises a spark gap or a switching device for galvanically disconnecting the down conductor from ground while a reception pattern is measured. Since a switching device would have to withstand a lightning strike itself, embodiments may include the use of a more robust spark gap. In this manner, the down conductor of the wind turbine blade is not galvanically connected to ground, such that the grounding of a large part of the electrical pulse can be prevented and the measurable signal strength is increased. In case of a lightning strike, however, the lightning current passes the spark gap and is transported to the ground.

Generally, it is advantageous to locate at least one first and/or second terminal at a root side end of the down conductor. In particular, the root terminal may be used as a first and/or second terminal of the sensing device. In this manner, at least one of the terminals is already provided and no additional installation is needed regarding this at least one terminal. Regarding the provision of the spark gap, it may also be provided between hub and blade root, in particular including the root terminal as a part of the spark gap, such that the root terminal can be used as described above.

It should be noted at this point that, in particular in the case of a common spark gap for down conductors of multiple blades in a hub and/or between hub and nacelle, the networks of multiple wind turbine blades of a wind turbine may be connected via their down conductors. In such a configuration, a common monitoring system for multiple wind turbine blades and/or all wind turbine blades connected to the hub of a wind turbine can be realised, wherein, in particular, first and/or second terminals may also be positioned in the hub and/or the electrical pulse may travel through multiple networks.

Regarding the wind turbine blade, generally, in exemplary embodiments, the first and second terminals may be located at a blade root-side edge of the network. In this manner, the terminals may be placed close to the blade root, where they are better accessible and no additional wiring along the length of the wind turbine blade is required, which might interact with other electrically conductive parts of the wind turbine blade and/or decrease the quality of transported signals and/or interact with the lightning protection system, in particular in the case of lightning attachment. Quite the opposite, in some embodiments, only short cables and/or wires are required to transport signals from the terminals and/or other components of the sensing device, in particular a control unit of the sensing device associated with the terminals, to components of, in particular, the evaluation device and/or further components of the sensing device, which may be located in the hub or nacelle. In particular, the sensing device can thus measure parts of the network close to or in the blade tip without needing access thereto.

In embodiments, the sensing device may comprise at least one control unit, and/or be completely installed in the wind turbine blade. Such a control unit, which may be understood as measurement electronics, for example to pre-process the reception pattern, in particular digitizing it, is located close to the second terminal where the reception pattern is to be measured in embodiments. In other words, the connection between the location of electrical measurement to the sensor equipment, that is, the control unit, should be small to avoid/reduce interference of signals, possibility of damage, installation hurdles and cost. Hence, in embodiments, the complete sensing device may be placed in the wind turbine blade, close to the location of measurement.

In an exemplary embodiment, at least one equipotential connector of the multiple equipotential connectors, which is located at the root side of the wind turbine blade, comprises a spark gap, wherein in particular all equipotential connectors except the one closest to the tip of the wind turbine blade comprise a spark gap. In this manner, if for example first and second terminals are provided at the root end of the down conductor and the structural component, respectively, it may be prevented that a large part of the signal of the electrical pulse is lost along the shortest possible way, that is, along the closest equipotential connector. Instead, the electrical pulse (or more of the electrical pulse) is forced to travel tip-wards until an equipotential connector without a spark gap is reached. If only the tip-most equipotential connector provides a galvanic connection, a large part of the signal of the electrical pulse will travel to the tip of the wind turbine blade, providing higher amplitudes of received pulses in the reception pattern regarding discontinuities at the tip. Consequently, highly accurate measurement is provided also in the area of the blade tip. Providing spark gaps in equipotential connectors, in particular those closer to the blade root, is possible since lightning currents may easily bridge the gap, compared to the low-voltage electrical pulses used for measurement. On the other hand, equipotential connectors closer to the blade tip have been identified as most relevant for carrying lightning current, since lightning, in most cases, strikes in the tip area of the wind turbine blade.

It is additionally noted that providing spark gaps in equipotential connectors closer to the blade root also simplifies the electrical network, hence reducing the complexity of the reception pattern and allowing easier evaluation. In summary, by providing spark gaps in equipotential connectors, the return signal is reduced in complexity and signal loss regarding discontinuities in the blade tip is also reduced.

As already briefly discussed, a reception pattern describing a reference state of the electrical network, in particular a state without any damages or aging effects, may be used to identify deviations from this reference state. Such a reference pattern may, for example, be acquired by at least one measurement of the electrical network in predefined measurement conditions, in particular at a certain temperature and/or air humidity. While it also possible that such a reference pattern is defined based on calculations and/or simulations on the impedance network, an acquired reference pattern based on measurement is used in an embodiment to consider manufacturing deviations. However, electrical properties like electrical conductance are temperature dependent, such that the measurement conditions when acquiring a reception pattern may, in some cases, relevantly differ from the predefined measurement conditions used while recording the reference pattern. More generally speaking, environmental conditions may also change at the site of the wind turbine between measurements whose reception patterns are to be compared, especially concerning temperature. In a similar manner, moisture dependence may also be considered.

An embodiment of the monitoring system according the present invention thus further comprises at least one temperature sensor, in particular provided as a part of the sensing device, wherein the evaluation device and/or the sensing device are configured to compensate the reception patterns and/or the health information for temperature effects with reference to a reference temperature, in particular based on at least one reference measurement performed at multiple measurement temperatures. If a reference pattern is used, the reference pattern may have been acquired at the reference temperature as part of the predefined measurement conditions. By taking the temperature into account, the accuracy of the proposed measurement can be increased, thus also improving the reliability and precision of the health information, in particular regarding the location and/or type and/or extent of damage. In concrete embodiments, the sensing device may comprise the temperature sensor, such that, for example, the control unit of the sensing device can already compensate for temperature effects or provide the temperature data along with the reception pattern. However, additionally or alternatively, a separate temperature sensor may be used, which may, for example, be placed elsewhere in the wind turbine and/or wind turbine blade, wherein the separate temperature sensor may be connected to the evaluation device and/or the sensing device to provide temperature data for compensation of temperature effects.

Further, when a temperature sensor is used, its temperature data may also be used when determining or assessing the health information. In particular, the evaluation device may be configured to take temperature data of the temperature sensor into account when determining the health information. Not only is impedance, from which strains may be determined, dependent on temperature effects, it has also been shown that, for example, the growth or in general the temporal evolution of damages is dependent on temperature, such that temperature data may also be relevant for the health information, not only the reception patterns describing the impedances.

In embodiments, the monitoring system may further comprise at least one lightning strike sensor, in particular comprising Rogowski coils, wherein the evaluation device is adapted to also use sensor data of the lightning strike sensor to determine at least the first health information. Traditional lightning strike sensors, which are often based on Rogowski coils, measure the number of lightning attachments to the wind turbine blade and at least one of the parameters of such a lightning strike, in particular the amplitude of the lightning current. They can be integrated into the hybrid monitoring system according to embodiments of the present invention to provide a more complete data basis for providing the health information, in particular the first health information regarding the lightning protection system. In this manner, the monitoring system may cover both lightning attachments and system health aspects. In concrete embodiments, the evaluation device may, for example, use information on how lightning strikes may influence or damage components of the wind turbine blade to more robustly identify and locate discontinuities and/or associate new discontinuities with past lightning attachments. It is noted that the lightning strike sensor may be a discrete device with its own evaluation, communication and storage devices or utilize the said devices of the monitoring system, and function as an integral part of the monitoring system.

Regarding lightning attachments, in exemplary embodiments, at least one lightning surge protection element and/or at least one retracting connector may be provided at one or both of the first and second terminals. In this manner, the hybrid sensing device may be isolated from lightning strike effects, wherein known surge protection devices and/or interrupters, in particular retracting connectors, may be employed. For example, ground fault circuit interrupters and fuses may be employed.

Since the reception pattern and the health information, in particular in the case of many discontinuities/impedance variations, may be complex and complicated to interpret, machine learning and/or artificial intelligence may also be employed regarding the evaluation. In exemplary embodiments, the evaluation device may be configured to use at least one trained artificial intelligence evaluation algorithm for evaluating the at least one reception pattern and/or the health information. Such trained artificial intelligence algorithms may also be called trained functions. In general, a trained artificial intelligence algorithm mimics cognitive functions that humans associate with other human minds. In particular, by training based on training data (machine learning), the trained function, that is the trained artificial intelligence algorithm, is able to adapt to new circumstances and to detect and extrapolate patterns.

In general, parameters of a trained artificial intelligence algorithm can be adapted by means of training. In particular, supervised training, semi-supervised training, unsupervised training, reinforcement learning and/or active learning can be used. Furthermore, representation learning (an alternative term is "feature learning") can be used. In particular, the parameters of the trained artificial intelligence evaluation algorithm can be adapted iteratively by several steps of training.

In particular, the artificial intelligence evaluation algorithm can comprise a neural network, a support vector machine, a decision tree and/or a Bayesian network and/or the trained artificial intelligent evaluation algorithm can be based on k-means clustering, Q-learning, genetic algorithms and/or association rules. In particular, a neural network can be a deep neural network, a convolutional neural network or a convolutional deep neural network. Furthermore, a neural network can be an adversarial network, a deep adversarial network and/or a generative adversarial network (GAN).

Training data for training the artificial intelligence evaluation algorithm may, for example, comprise measurement data for known states of wind turbine blades and/or simulation data, for example from a simulation of the electrical network of impedances.

Embodiments of the present invention also comprise a wind turbine arrangement comprising at least one wind turbine, in which multiple wind turbine blades are installed, and at least one monitoring system according to embodiments of the present invention. The wind turbine arrangement may, in particular, comprise at least one wind turbine in which the multiple wind turbine blades are installed. A sensing device may be associated with each blade or multiple blades of a wind turbine, such that, for example each wind turbine blade comprises at least one pair of first and second terminals, which may be implemented as a combined transmission and reception terminal. The evaluation device may evaluate reception patterns from a single wind turbine blade, from all wind turbine blades of a certain wind turbine and/or even be associated with all wind turbines of a wind turbine park, thus receiving and evaluating all reception patterns from all wind turbine blades of all wind turbines of the inventive wind turbine arrangement. As already discussed, at last part of the evaluation device and/or a control device to which the health information is sent may be located remotely from the wind turbine, for example in a monitoring and/or maintenance center for the at least one wind turbine, in particular multiple wind turbines and/or wind turbine parks. Such a monitoring center may be located on land, while the at least one wind turbine may be an off-shore wind turbine.

Of course, all features and remarks regarding the monitoring system according to embodiments of the present invention analogously apply to the wind turbine arrangement according to embodiments of the present invention and vice versa, such that the same and additional advantages can be achieved.

In concrete embodiments, one monitoring system may be associated with each combination of first and second terminals designated for measuring a reception pattern, or with each single wind turbine blade, or with each single wind turbine, or even with all wind turbines. In embodiments, at least one of the at least one monitoring system may be partly installed in the hub and/or nacelle and/or tower of at least one of the at least one wind turbine. As already discussed, communication, for example between sensing devices and evaluation devices (or other systems), may rely on wireless, wired electrical, wired optical and other technologies. In particular regarding the evaluation device, it may, at least partly, be installed in a hub and/or a nacelle or even the tower of the wind turbine, in particular if the evaluation device is associated with multiple or all wind turbine blades of the wind turbine.

In a method for monitoring of at least one wind turbine blade according to embodiments of the present invention, at least one monitoring system according to embodiments of the present invention is used. All remarks and features regarding the monitoring system according to embodiments the present invention and the wind turbine arrangement according to embodiments of the present invention may analogously be applied to the method according to embodiments of the present invention and vice versa.

In embodiments, a measurement of reception patterns may be performed each time a lightning strike sensor of the wind turbine detects a lightning strike, and/or each time a measurement criterion describing a non-standard and/or heightened aerodynamic and/or structural loading condition of the wind turbine blade is fulfilled, and/or each time a change in energy production of the wind turbine or a wind turbine park, in which the wind turbine (2) is installed, is detected, and/or continuously over a defined period of time, and/or periodically.

According to embodiments of the present invention, various possibilities exist with respect to the monitoring frequency/the time points at which monitoring is conducted. For example, a reception pattern may be measured and evaluated over a single instance in time, in particular after a lightning strike sensor has detected a lightning attachment or if another event is detected, for example an unexpected condition of the wind turbine blade, for example regarding the load distribution. Various sensors may be used to detect such an event. For example, the wind turbine/wind turbine park may have different sensors that can provide information on changes to wind and structural load conditions the wind turbine blades are exposed to. Of particular interest may be extreme events, for example, sudden strong gusts or vibrations which are sensed by the various sensors/systems on a wind turbine. If such heightened aerodynamic and/or structural loading condition are detected, a measurement via the hybrid monitoring system may also be initiated.

Monitoring may also be triggered by certain changes in energy production. For all these events, this may be seen as a first check to decide if the wind turbine needs to be shut down for its protection and/or requires maintenance/repair. Additionally or alternatively, monitoring may be conducted continuously over a period of time. For example, as the wind turbine blade rotates, the structural components, in particular spark gaps, and equipotential connectors are subjected to varying loads/strains, which changes their impedance. Using continuous monitoring, an analysis of such loads and the effects of the lightning protection system and the structural health of the wind turbine blade can be carried out. Finally, alternatively or additionally, monitoring may be effected over discrete time points or intervals over a period of time. This allows, for example, to study long-term effects such as fatigue and/or to forecast the lifetime of the wind turbine blade. Another example pertains to analysis following a failure or repair or maintenance made in the field, wherein the failure or repair/maintenance would affect the loads applied on the structural components, or vice versa. Of course, it is also possible to define certain discrete time points for measurement.

Generally, the monitoring system and method of embodiments of the present invention may also be applied for quality control and/or testing of wind turbine blades, whether they are installed or not installed.

In the method according to embodiments of the present invention, a wind turbine blade which is not installed to a wind turbine may be quality-controlled and/or tested, wherein at least one additional first or second terminal, in particular in a tip portion of the wind turbine blade and/or at a lightning receptor and/or at a lightning receptor-side end of the down conductor, may be used for measuring at least one reception pattern. In other words, the monitoring system may also be used for quality control/testing, in particular during blade fatigue tests. In this respect, new options for connection between the sensing device and the electrical network of the wind turbine blade exist, that is, new positions for terminals may be realised, since the far end of the wind turbine blade, in particular the lightning protection system and the blade tip, may be accessed. For example, lightning receptors, or a direct but temporary connection to the down conductor or at least one equipotential connector, in particular at the blade tip, may be used as first and/or second terminal.

It should be noted at this point that health information, according to embodiments of the present invention, may also describe a current state of the wind turbine blade, in particular the at least one structural component, the lightning protection system and/or the equipotential connector. As already discussed above, different strains, in particular in the at least one structural component, may lead to different impedances, such that reception patterns differing from reference patterns may also be a result of a momentaneous load on the wind turbine blade. This is in particular advantageous regarding analysis of behaviour of wind turbine blades in the field.

Regarding the method of embodiments of the present invention and the configuration of the evaluation device and/or a connected control device, health information may, in particular after temperature compensation, first be evaluated regarding possible damages to the at least one structural component and/or the lightning protection system. If no damage is detected, however, the health information may be stored in a storage means, in particular a memory, nonetheless, in particular for later analysis, in particular regarding behaviour, aging processes and the like. If damage is detected, the damage location, type and extent, which are part of the health information in some embodiments, may be evaluated to decide whether safe wind turbine operation is still possible. If not, an error code can be generated and the wind turbine hardware can be stopped by a corresponding control signal. In exemplary embodiments, a test whether the hybrid sensing of the sensing device is still possible may also be performed, resulting, optionally, in an error code generation if hybrid sensing is no longer possible. In any case, detected damage, in particular leading to a stop of the wind turbine operation, may also lead to an alarm for example at a remote monitoring station.

If damage to the at least one structural component and/or the lightning protection system is detected, which does not justify a stop of wind turbine operation, it may, however, be checked if at least one safe operation mode of the wind turbine should be activated. In such a safe operation mode, threshold values regarding the operation of the wind turbine may be adjusted, for example by decreasing allowable wind speeds and/or turbulence values. Another result of detected damage and/or other detected effects, in particular also loads, may be an increase in the monitoring frequency. For example, if higher strains than expected are detected for the at least one structural component, a safe operation mode may be chosen and/or the monitoring frequency may be increased, that is, reception patterns may be acquired more often. For example, if the health information indicates a strain on the at least one structural component exceeding a threshold value, this may also lead to increased monitoring frequency and/or adjustment of thresholds defining the operation range of the wind turbine, for example activation of a safe operation mode.

It is noted that trained artificial intelligence assessment algorithms may also be employed when evaluating the health information, for example concerning damages and/or safe mode criteria. In these contexts, various design, manufacturing, and/or operational conditions must be considered. Operational conditions may include damage and repair history in addition to environmental conditions. Further, artificial intelligence may be employed when trying to derive the cause of damage to the wind turbine blade.

BRIEF DESCRIPTION

Some of the embodiments will be described in detail, with reference to the following figures, wherein like designations denote like members, wherein.

DETAILED DESCRIPTION

Figure 1:
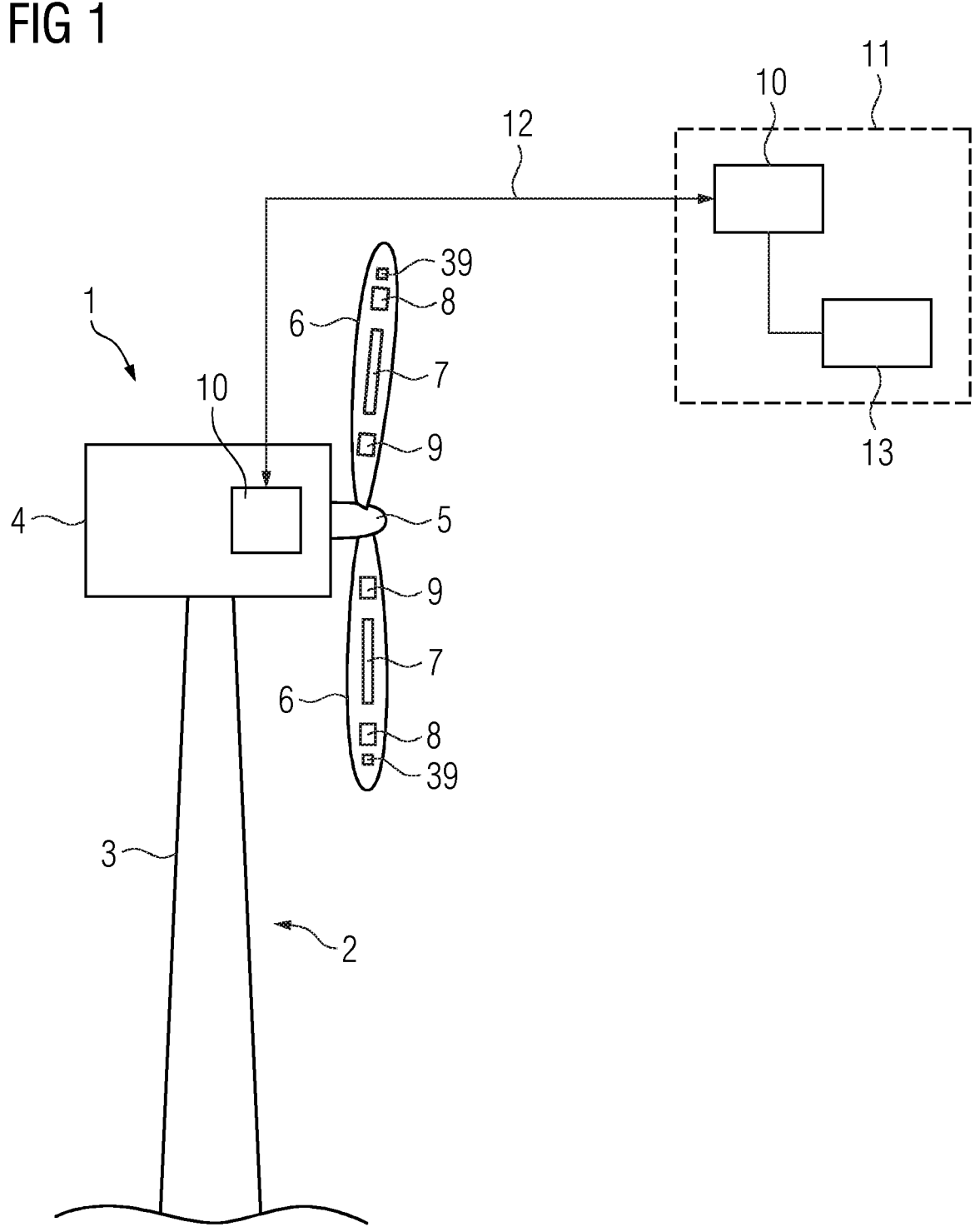
FIG. 1 depicts a wind turbine arrangement according to embodiments of the present invention.

FIG. 1 shows a principle drawing of a wind turbine arrangement 1 according to embodiments of the present invention. The wind turbine arrangement 1 comprises at least one wind turbine 2, in this case at least one off-shore wind turbine, which may, for example, be part of a wind turbine park. The wind turbine 2 comprises, as principally known, a tower 3, a nacelle 4, a hub 5 and wind turbine blades 6, in this case three wind turbine blades 6 attached to the hub 5 such that electrical energy can be generated from rotation of the arrangement of the wind turbine blades 6 and hub 5 in the nacelle 4.

As only indicated in FIG. 1, each blade comprises at least one electrically conductive structural component 7, in this case spar caps, which comprise CFRP and/or another electrically conductive composite as a material. In each wind turbine blade 6, further, a lightning protection system 8 is installed. A down conductor of the lightning protection system 8 and the at least one structural component 7 are electrically conductively connected by equipotential connectors (equipotential bonds), forming a network of electrical impedances. This network of electrical impedances is used to implement a hybrid monitoring system able to both monitor the structural health of the at least one structural component 7 and the lightning protection system 8. The monitoring system comprises a sensing device 9, in this case installed in the wind turbine blades 6, and an evaluation device 10, which is, in this case, partly installed in the wind turbine 2, for example in the nacelle 4 or the hub 5, and partly remotely located at a monitoring center 11, wherein a communication link 12 is established between the different parts of the evaluation device, which is at least partly wireless. The communication link 12 also used by a controller of the wind turbine 2.

At the monitoring center 11, the evaluation device 10 may be connected to a monitoring station 13, where, for example, alarms, warnings and other notifications can be output.

Figure 2:
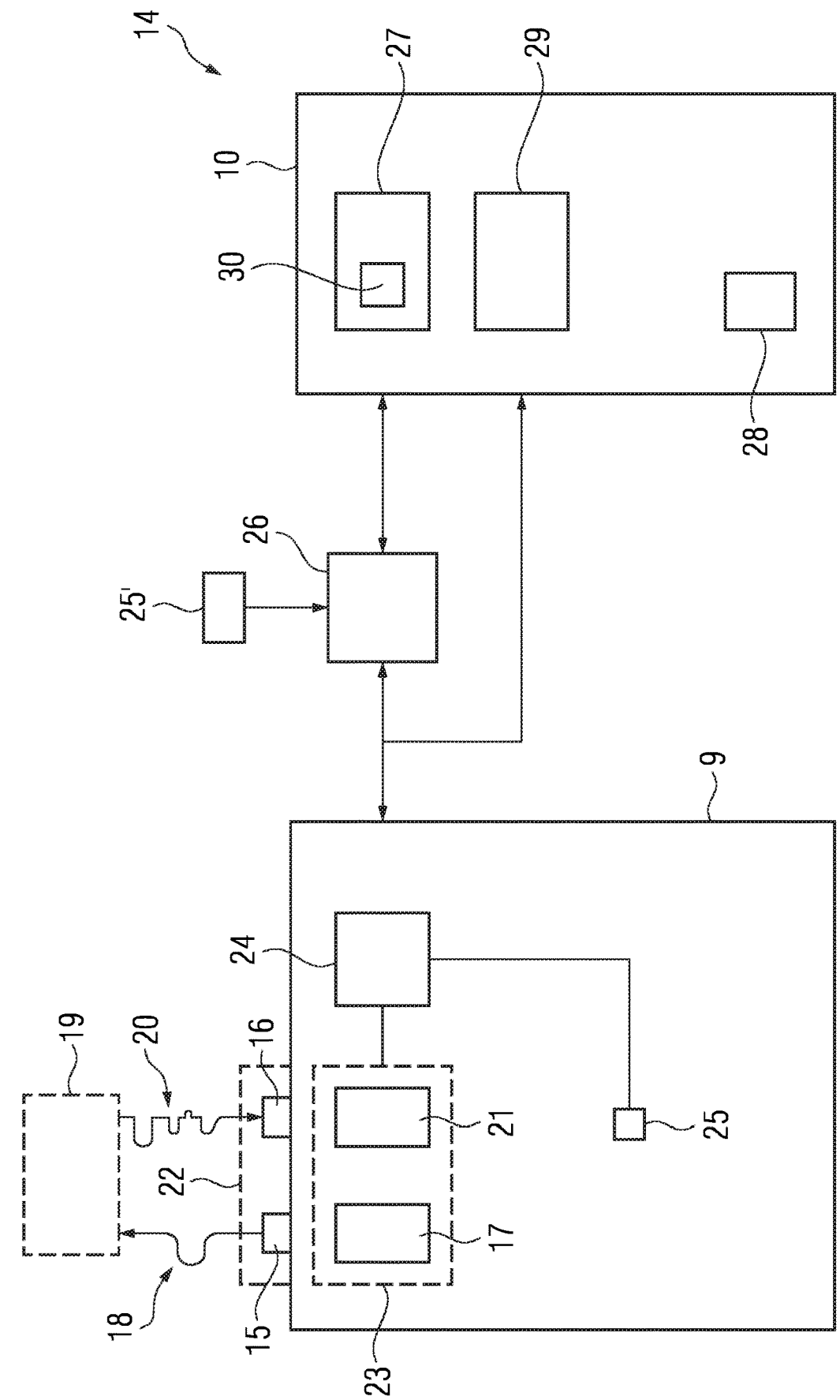
FIG. 2 depicts a functional drawing of a monitoring system according to embodiments of the present invention.

FIG. 2 illustrates the functional structure of the monitoring system 14. The sensing device 9 comprises at least one first terminal 15 and at least one second terminal 16. The first terminal 15 is connected to a transmitter 17, such that an electrical pulse 18 can be emitted (sent) into the electrical network 19 of the wind turbine blade 6, which is only schematically indicated here. As principally known from other applications in the state of the art, the electrical pulse is at least partly reflected and at least partly transmitted by discontinuities, in particular impedance variations, in the network 19, to which also the second terminal 16 is connected, such that a reception pattern 20 is received by a receiver 21 connected to the second terminal 16 as a response to the transmission of the electrical pulse 18. Of course, different measurements can be conducted by using different first and/or second terminals 15, 16 and/or using terminals 22 as first terminals 15 as well as second terminals 16. That is, first and second terminals 15, 16 can be integrated into one combined transmission and reception terminal 22, and the transmitter 17 and the receiver 21 can be integrated into a transceiver 23.

In two possible configurations, the electrical pulse 18 may be sent from a combined transmission and reception terminal 22 as first terminal 15 and its reception pattern 20 may be received by the same combined transmission and reception terminal 22 as second terminal 16, or spaced apart first and second terminals 15, 16, i.e. connected at different positions to the network 19, may be used. Both time-domain reflectometry (TDR) and time-domain transmissometry (TDT) may be employed, wherein TDR focuses on reflected signals, while TDT focuses on transmitted signals, as discussed above.

The sensing device 9 further comprises a control unit 24, which may, in embodiments, already comprise a part of the evaluation device 10. The control unit 24, which may also be termed measurement electronics or instrumentation module, may pre-process received reception patterns 20, in particular by digitizing them, and/or partly evaluate reception patterns 20. These processes may, for example, comprise signal conditioning, filtering, analogue-to-digital-conversion and the like. Of course, in embodiments, the control unit 24 is also adapted to control signal generation of the transmitter 17 to send the electrical pulse 18 into network 19. In summary, the control unit 24 controls measurement operation of the sensing device and provides, in particular pre-processed, reception patterns 20 to the evaluation device 10.

As shown, the sensing device 9 may also comprise a temperature sensor 25 to acquire information on current measurement conditions. Such temperature data may be used to compensate the reception pattern regarding temperature effects, in particular temperature-dependent impedances of components of the network 19. Such temperature data may also be received from an external temperature sensor 25', as shown connected to a wind turbine controller 26. Temperature data from the temperature sensor 25, 25' may also be used in later stages of the evaluation, for example regarding the growth of detected damages.

Regarding the control unit 24, it is noted that if a reference pattern is used, comparison to the reference pattern, in particular calculating the difference between a reception pattern 20 and the reference pattern, may already be performed in the control unit 24, but also in components of the evaluation device 10 external to the sensing device 9. Such a reference pattern may be acquired for an intact, new network 19 in advance and/or describe a should-be state of the network 19. The reference pattern may refer to a certain reference temperature, which is also used as the reference temperature for temperature compensation. Of course, these remarks also apply if comparison to the reference pattern is performed external to the sensing device 9.

Communication between the sensing device 9 and the evaluation device 10 may be via the wind turbine controller 26 or bypassing the wind turbine controller 26. Communication may, generally speaking, rely on wireless, wired electrical and/or wired optical technologies.

It is noted that, in some embodiments, the first and second terminals 15, 16 are located at a blade root side of the network 19 of the wind turbine blade 6. In some embodiments, the transmitter 17, the receiver 21 and in particular also the control unit 24 are placed in close proximity to at least the second terminal 16, such that electrical connections are short to avoid and/or reduce interference and/or deterioration of the signals sent into and received from the network 19. Additionally, the possibility of damage, installation hurdles and cost are reduced.

In order to isolate the sensing device 9 from the network 19 in the case of a lightning strike/lightning attachment, surge protection devices and/or interrupters, in particular retracting connectors, may be employed, which are not shown for reasons of simplicity in FIG. 2.

In this embodiment, each wind turbine blade 6 comprises its own sensing device 9 which is completely installed in the respective wind turbine blade 6. However, in some embodiments, it is also possible to have one sensing device associated with all blades 6 of a wind turbine 2 and/or parts of the sensing device 9 installed in the hub 5 or the nacelle 4.

In the described embodiment, the evaluation device 10 comprises an evaluation unit 27 for evaluating reception patterns 20 to derive a first health information regarding the lightning protection system 8 and a second health information regarding the structural health of the structural component 7, which are, in combination, referred to as health information.

The health information may describe the location and at least one property of a discontinuity, in particular a discontinuity changed and/or additional to discontinuities in the reference pattern. By evaluating the travelling time of a received pulse of the reception pattern 20, the location can be determined, while from the pulse shape of received pulses, in particular the amplitude, properties of discontinuities, that is, in particular impedance variations, may be derived.

For example, for a discontinuity describing damage, type and extent of the damage may be derived as part of the health information. In this manner, location, type and extent of damage become known, such that repair and/or maintenance may be better planned and efficiently performed.

On the other hand, health information may also describe a current state of the wind turbine blade 6, since it has been shown that different strains on CFRP components result in different impedances, such that, for example, the load on the wind turbine blade 6 may be estimated from such information. In this respect, health information of the monitoring system 14 may also be used for monitoring behaviour and/or aging of the wind turbine blade 6, so that, for example, lifetimes can be estimated. However, such health information, which is, for each measurement, stored in a storage means 28, in particular a memory, of the evaluation device 10, may also be fed back into design and development such that properties of future wind turbine blades 6 may be improved.

The evaluation device 10 may also comprise a command unit 29, which may also be externally implemented in a dedicated control device. The command unit 29 evaluates/assesses the health information with regard to measures to be taken, be it the generation of control signals for the wind turbine 2 or the output of alarms/generation of error codes. For example, if health information describes damage fulfilling a criticality criterion, indicating that further operation of the wind turbine 2 would be too risky, operation of the wind turbine 2 can stopped by generating corresponding control signals, in particular to the wind turbine controller 26. If the damage is less severe, for example fulfilling a safe mode criterion, the wind turbine 2 may be switched to operate in at least one corresponding safe operation mode, in which, for example, a wind speed interval in which rotation of the blades 6 is allowed, is reduced and/or a turbulence value interval, wherein the turbulence value describes the strength of wind turbulences, is reduced. In this manner, forces acting onto the wind turbine blades 6 in operation may be reduced.

It is also possible to evaluate the health information by a frequency increase criterion, wherein, if it is fulfilled, the monitoring frequency may be increased. The increase of monitoring frequency may, however, also be included in a safe operation mode.

It is noted at this point that in some embodiments, for each monitoring measurement, at least two reception patterns 20 may be acquired using different first and/or second terminals, such that are more robust evaluation may be achieved. Additionally or alternatively, reception patterns may be acquired at different time points and, in particular, be evaluated together. These different time points may correspond to different rotational positions of the wind turbine blade 6. It is further possible to use different electrical pulses, in particular to choose pulse characteristics, in particular pulse shape, to achieve a certain measurement goal, for example closer examination of a discontinuity or degradation detected in a first measurement pattern. In the evaluation process inside the evaluation device 10, artificial intelligence and machine learning may also be employed. In particular, a trained artificial intelligence evaluation algorithm 30 may be used to evaluate the often complex reception patterns 20. Additionally, trained artificial intelligence assessment algorithms may be used regarding damage assessment and/or operational safety assessment.

Figure 3:
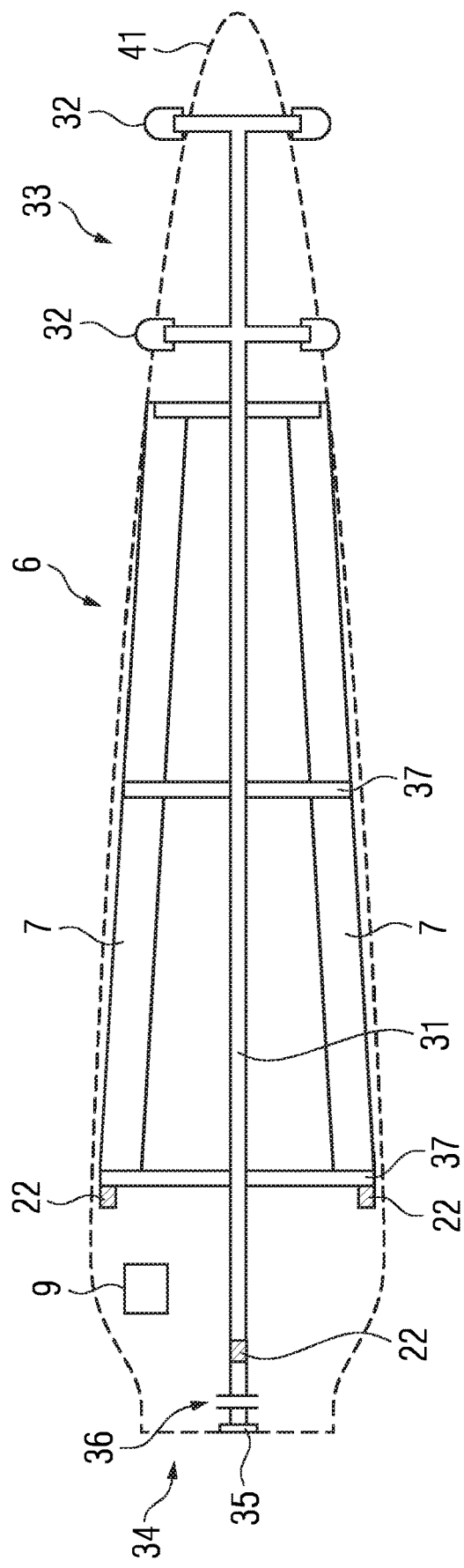
FIG. 3 depicts a schematic cross-sectional view of a wind turbine blade.

FIG. 3 shows a schematic, cross-sectional view of one of the wind turbine blades 6. The dashed line 41 indicates the blade geometry. As can be seen, the lightning protection system 8 comprises a down conductor 31 which is connected to lightning receptors 32 (air terminations) at the surface of the wind turbine blade 6. In the embodiment shown in FIG. 3, the lightning receptors 32 are positioned at the tip 33 of the wind turbine blade 6. The down conductor 31 is guided all the way to the root 34 of the blade 6, where it can be connected to ground via a root terminal 35. In this case, in addition to the root terminal 35 or as a part thereof, the connection to ground at the blade root 34 also comprises a spark gap 36 such that the network 19 of electrical impedances, formed by the down conductor 31, the at least one structural component 7 and the equipotential connectors 37 is not galvanically connected to the ground. This prevents large parts of the electrical pulse 18 from simply being transported to ground. Such a spark gap 36 may also be provided in the hub 5 or on the hub-side of the root terminal 35 in the blade, such that the root terminal 35 may directly be used as terminal 22, or at the ground connection from hub 5 to nacelle 4, for example for all wind turbine blades 6.

In the embodiment of FIG. 3, three combined transmission and reception terminals 22 at the side of the network 19 facing the blade root 34 are used, each of which can be used as a first terminal 15 and/or a second terminal 16. These terminals 22 are all connected to the other components of the sensing device 9, which is only schematically indicated in FIG. 3. Two of these terminals 22 are positioned at the root side end of the at least one structural component 7, one of these terminals 22 is positioned at the root terminal 35 of the down conductor 31 at the network side of the spark gap 36. To record reception patterns, each of these terminals 22 can be used in the manner of time domain reflectometry or in the manner of time domain transmissometry, such that, for example, the electrical pulse 18 may use one of the outer terminals 22 at the root-side end of the structural component 7 to be sent into the network 19 and the terminal 22 of the down conductor 31 may be used as second terminal 16. Or for example, both terminals 22 associated with the structural component 7 may be used as first terminals 15 and the reception patterns 20 may be received at the terminal 22 associated with the down conductor 31.

Of course, FIG. 3 is only exemplary and differently positioned terminals as well as other structures of the network 19, for example using more or less than three equipotential connectors 37, may be used.

Figure 4:
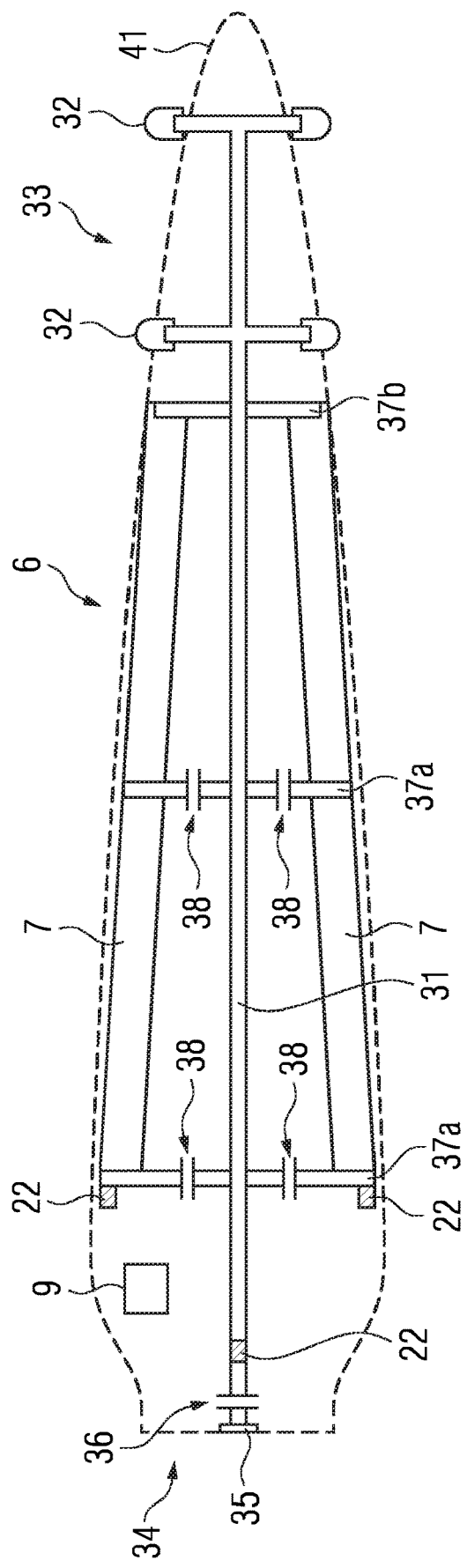
FIG. 4 depicts an alternative configuration of a wind turbine blade.

FIG. 4 shows a, second concrete embodiment of a wind turbine blade 6. As a difference to the embodiment of FIG. 3, the two equipotential connectors 37a which are closest to the blade root 34 comprise spark gaps 38, while the equipotential connector 37b closest to the blade tip 33 does not comprise these spark gaps 38. In this manner, the electrical pulse 18 is forced to travel all the way through the structural component 7 or the down conductor 31 to the blade tip 33, in this manner simplifying the reception pattern 20 and providing high signal strength for received pulses of the blade tip 33. Hence, a more robust and accurate measurement can be performed.

Figure 5:
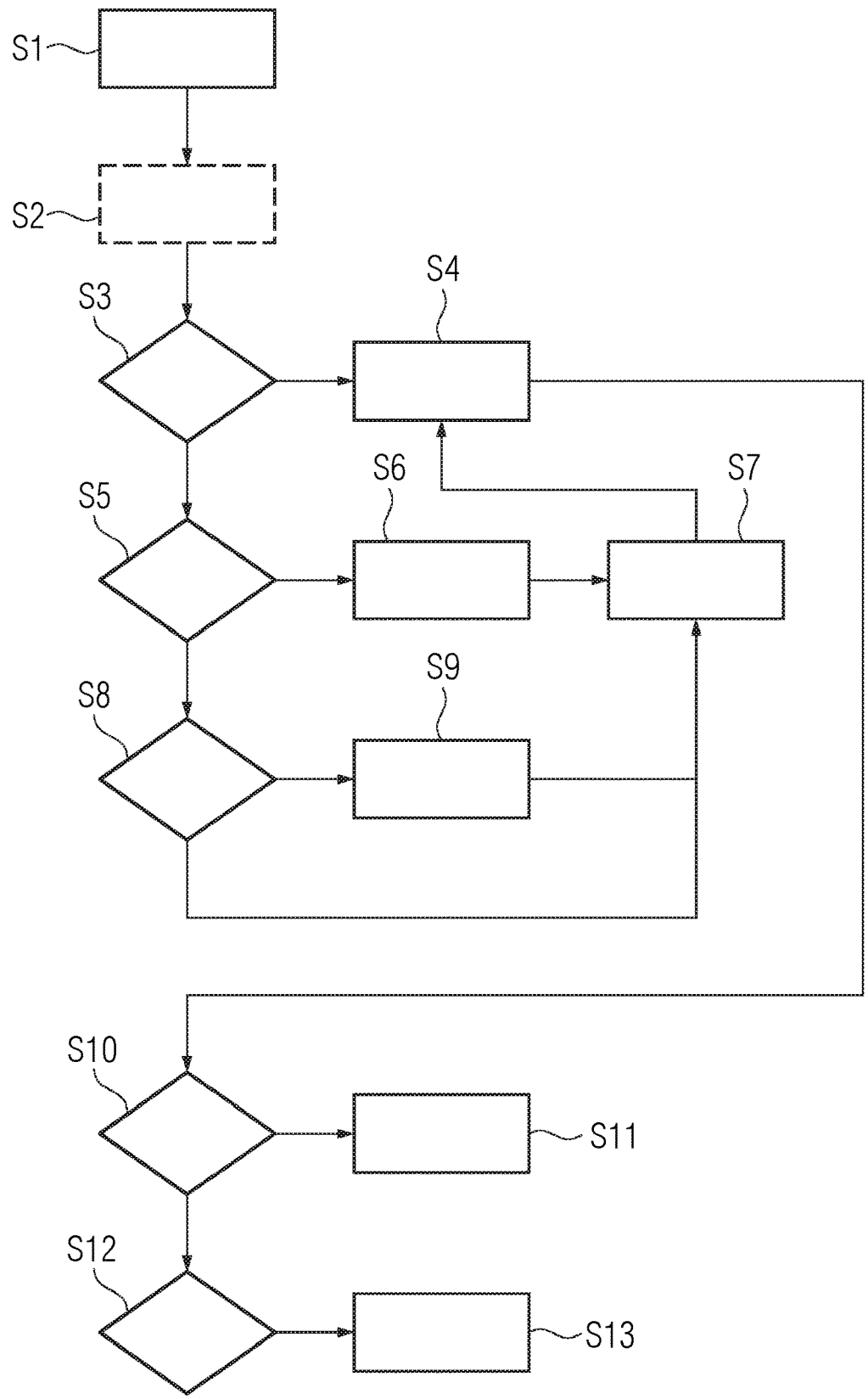
FIG. 5 depicts a flow chart of a method according to embodiments of the present invention.

FIG. 5 is a flow chart illustrating an embodiment of a method according to embodiments of the present invention. In a step S1, measurement of at least one reception pattern 20 is performed and corresponding first and second health information are determined by evaluation of the reception patterns, as already described above. Optionally, as also discussed above, temperature compensation can be performed, as indicated by step S2. Temperature data may also be taken into account later on, when the health information itself is evaluated.

In a step S3, it is checked whether the health information indicates that damage has occurred. If no damage has occurred, the health information is stored into memory 28 in a step S4. If, however, damage has occurred, in a step S5, it is checked whether the health information concerning the damage, that is, in particular, location, type and extent of damage, fulfils a criticality criterion, indicating that safe operation of the wind turbine 2 is no longer possible. The criticality criterion can, of course, also take into account other detected damages and/or repairs. Artificial intelligence may be employed.

If it is decided in step S5 that safe operation of the wind turbine 2 is no longer possible, in a step S6, a corresponding error code is generated and a control signal to the wind turbine controller 26 to stop operation of the wind turbine 2 is generated. Additionally, in a step S7, an alarm is output at the monitoring station 13.

If, in step S5 it has been decided that it is safe to continue to operate the wind turbine 2, in a step S8, a safe mode criterion evaluating the health information can be evaluated. If the safe mode criterion is fulfilled, it is indicated that the damage to the wind turbine 2, while not prohibiting further operation, should lead to operating the wind turbine 2 in a safe operation mode such that less forces and strains are exerted onto the wind turbine blades 6. Thus, if the safe mode criterion is fulfilled, in a step S9, control signals are generated for the wind turbine controller 26 to switch into safe operation mode, wherein, for example, an operation interval regarding wind speeds and/or turbulence values is reduced. An error code is again generated and an alarm is output in step S7, whereafter the information is stored in the storage means 28 in step S4. It is noted that it is possible to use multiple safe mode criteria each having associated with them a certain safe operation mode.

In a general step S10, it is checked whether hybrid sensing by the sensing device 9 is still possible, that is, damages do not impair it and there are no failures in the corresponding components of the sensing device 9. Should hybrid sensing no longer be possible, an error code and alarm are again generated in step S11. If, however, hybrid sensing is still possible, in a step S12, it is checked whether the health information fulfils a frequency increase criterion, wherein, if the frequency increase criterion is fulfilled, measurement of reception patterns 20 are taken at a higher measurement frequency in step S13 by the sensing device 9. This may, for example, be sensible if the evolution of a discontinuity is to be observed and/or large strains in the wind turbine blade 6 have been detected which may be critical if present for a longer time.

Regarding monitoring frequency/measurement frequency, independently of the concrete embodiment of FIG. 5, it is noted that several approaches are possible, which may also be used in combination. For example, measurements of at least one reception pattern 20 may be performed periodically to study long-term effects such as fatigue and/or forecast the lifetime of the wind turbine blade 6. In a further example, measurements may be taken continuously over a defined period of time, for example to monitor varying loads to which the wind turbine blade 6 is subjected as the wind turbine blade 6 rotates. In this manner, an analysis of such loads and their effect on the lightning protection system 8 and structural health can be performed.

In a third example, measurement may be triggered by at least one event. Such an event may be a lightning strike (lightning attachment) which may be detected by at least one lightning strike sensor 39 (see FIG. 1). Such a lightning strike sensor 39 may, for example, comprise at least one Rogowski coil, may have its own evaluation device or utilize the evaluation device 10 of the monitoring system 14, and may provide information regarding the number of lightning attachments to the wind turbine blade 6 and their parameters, in particular regarding lightning current. The lightning strike sensor 39 may also be positioned and/or configured to also detect lightning strikes to the structural component 7.

It is noted, that such lightning strike sensor data can also advantageously be taken into account when evaluating the at least one reception pattern 20 (step S1) or any of the criteria, since this additional information renders the evaluation more accurate, reliable and robust. For example, a newly detected damage may be directly connected to a previous lightning attachment, which can be analysed regarding the lightning current and the lightning receptor 32 to which the lightning attached.

Figure 6:
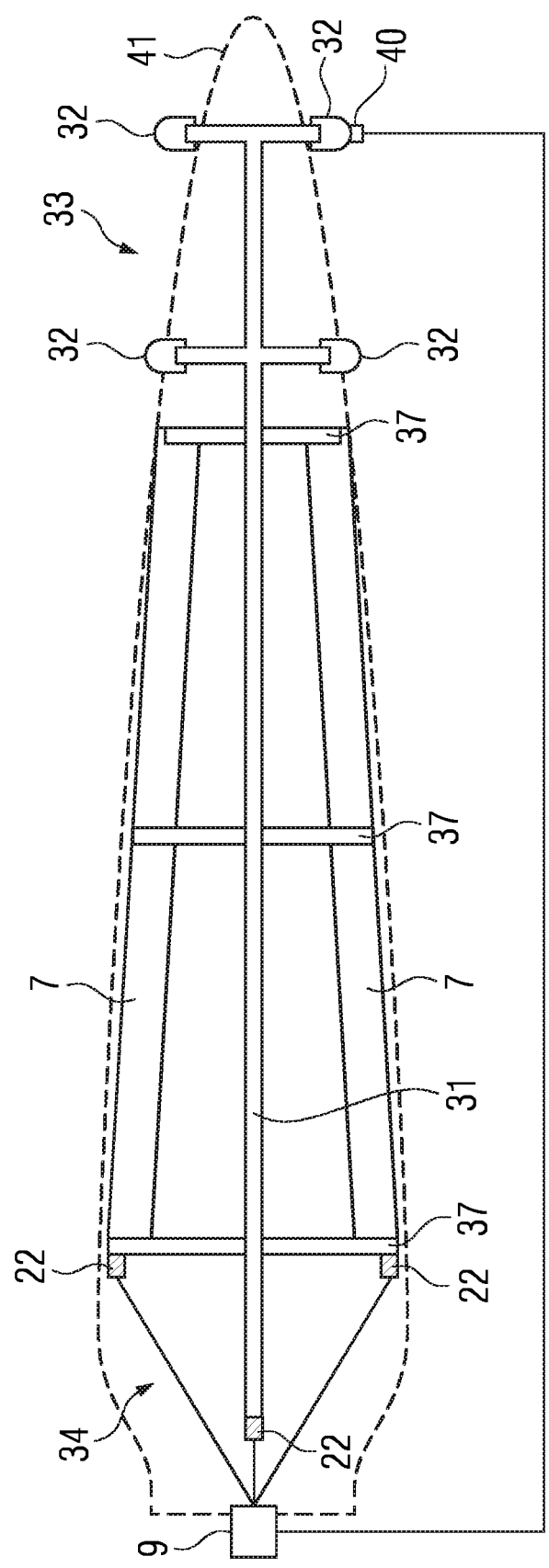
FIG. 6 depicts a test configuration for a not installed wind turbine blade.

It is finally noted that the monitoring system 14 can also be applied to wind turbine blades 6 not installed in a wind turbine, i.e. at the ground. The monitoring process may then serve for testing and/or quality control, for example at the end of production and/or after repair and/or maintenance have been performed on the wind turbine blade 6. Since, in this case, the wind turbine blade 6 is not installed in the wind turbine 2, additional first and/or second and/or combined terminals 15, 16, 22 at the blade tip 33 may be employed, as indicated in the schematic view of FIG. 6.

As indicated, the sensing device 9 not only uses the terminal 22 as described above at the blade root 34, but at least one additional terminal 40 at one of the lightning receptors 32 to obtain additional reception patterns 20, providing additional information, in particular highly accurate information from the area of the blade tip 33. The terminal 40 may be used as a first terminal 15 and/or a second terminal 16 and may in particular be a combined transmission and reception terminal 22.

Although the present invention has been described in detail with reference to the exemplary embodiments, the present invention is not limited by the disclosed examples from which the skilled person is able to derive other variations without departing from the scope of embodiments of the present invention.

Although the present invention has been disclosed in the form of preferred embodiments and variations thereon, it will be understood that numerous additional modifications and variations could be made thereto without departing from the scope of the invention.

For the sake of clarity, it is to be understood that the use of "a" or "an" throughout this application does not exclude a plurality, and "comprising" does not exclude other steps or elements.

What is claimed:

1. A system, comprising:
a wind turbine blade, wherein the wind turbine blade comprises at least one electrically conducting or semi-conducting structural component and a lightning protection system having a down conductor electrically connected to at least one lightning receptor, wherein the down conductor is electrically connected to the at least one structural component by at least one equipotential connector, such that, in the wind turbine blade, a network of electrical impedances comprising the at least one structural component, the at least one equipotential connector, and the down conductor is formed;
a sensing device for the network, comprising at least one transmitter for emitting an electrical pulse into the network via at least one first terminal and at least one receiver for receiving at least one reception pattern of the electrical pulse from the network via at least one second terminal; and
an evaluation device for evaluating the at least one reception pattern, to determine a first health information regarding the lightning protection system, and a second health information regarding the at least one structural component;
wherein the sensing device and evaluation device together provide monitoring of both the lightning protection system and the structural health of the at least one structural component.

2. The system according to claim 1, wherein the at least one structural component is a beam and/or a spar cap, and/or the evaluation device is at least partly located external to the wind turbine blade, and connected to the sensing device and/or a remaining part of the evaluation device by a communication link.

3. The system according to claim 1, wherein the evaluation device is adapted to determine, as the first health information and/or the second health information, the location and/or at least one property of a discontinuity, described by at least one received pulse of the reception pattern and/or wherein the evaluation device and/or a control device receiving the respective health information is configured to generate at least one control signal for the wind turbine based on the respective health information.

4. The system according to claim 1, wherein the down conductor is connected to ground via a ground connection at a root terminal at a root of the wind turbine blade, wherein the ground connection at the blade root and/or a ground connection from a hub of a wind turbine to a nacelle of the wind turbine comprises a spark gap or a switching device for galvanically disconnecting the down conductor from ground while a reception pattern is measured, and/or wherein at least one second terminal is located at a root side end of the down conductor.

5. The system according to claim 1, wherein the at least one first terminal and the at least one second terminal are located at a blade root-side edge of the network and/or the sensing device comprises at least one control unit and/or the sensing device is completely installed in the wind turbine blade.

6. The system according to claim 1, wherein one or more equipotential connectors of the at least one equipotential connector, which is located at a root side of the wind turbine blade, comprises a spark gap.

7. The system according to claim 1, further comprising at least one temperature sensor, wherein the evaluation device and/or the sensing device are configured to compensate the reception patterns for temperature effects with reference to a reference temperature, and/or the evaluation device is configured to take temperature data of the temperature sensor into account when determining the first health information and/or the second health information.

8. The system according to claim 1, further comprising at least one lightning strike sensor, wherein the evaluation device is adapted to also use sensor data of the lightning strike sensor to determine at least the first health information.

9. The system according to claim 1, wherein at least one lightning surge protection element and/or at least one retracting connector is provided at one or both of the first and second terminals.

10. A wind turbine arrangement comprising at least one wind turbine, in which multiple wind turbine blades are installed, and at least one system according to claim 1.

11. The wind turbine arrangement according to claim 10, wherein one respective system is associated with each combination of first and second terminals designated for measuring a reception pattern or with each single wind turbine blade or with each single wind turbine.

12. The wind turbine arrangement according to claim 10, wherein at least one of the at least one system is partly installed in a hub and/or a nacelle and/or a tower of at least one of the at least one wind turbine.

13. A method, comprising:
providing a wind turbine blade, wherein the wind turbine blade comprises at least one electrically conducting or semi-conducting structural component and a lightning protection system having a down conductor electrically connected to at least one lightning receptor, wherein the down conductor is electrically connected to the at least one structural component by at least one equipotential connector, such that, in the wind turbine blade, a network of electrical impedances comprising the at least one structural component, the at least one equipotential connector, and the down conductor is formed;
providing at least one transmitter for emitting an electrical pulse into the network via at least one first terminal and at least one receiver for receiving at least one reception pattern of the electrical pulse from the network via at least one second terminal;
emitting the electrical pulse into the network;
receiving the at least one reception pattern; and
evaluating the at least one reception pattern to determine a first health information regarding the lightning protection system and a second health information regarding the at least one structural component.

14. The method according to claim 13, further comprising: evaluating the at least one reception pattern when
- a lightning strike sensor of the wind turbine detects a lightning strike, and/or
- a measurement criterion describing a non-standard and/or heightened aerodynamic and/or structural loading condition of the wind turbine blade is fulfilled, and/or
- a change in energy production of the wind turbine or a wind turbine park, in which the wind turbine is installed, is detected, and/or continuously over a defined period of time, and/or periodically.

15. The method according to claim 13, wherein the wind turbine blade is not installed to a wind turbine and is quality-controlled and/or tested, wherein at least one additional first or second terminal is used for evaluating the at least one reception pattern.

\* \* \* \* \*